United States Patent [19]

Geib

[11] Patent Number: 5,695,297

[45] Date of Patent: Dec. 9, 1997

[54] MOUNTING DEVICE

[75] Inventor: Randall R. Geib, Manheim, Pa.

[73] Assignee: Fenner, Inc., Manheim, Pa.

[21] Appl. No.: 712,168

[22] Filed: Sep. 11, 1996

[51] Int. Cl.$^6$ .................................................. F16B 2/14
[52] U.S. Cl. ........................................ 403/371; 403/369
[58] Field of Search .............................. 403/369, 370, 403/371

[56] References Cited

U.S. PATENT DOCUMENTS

| | | | |
|---|---|---|---|
| 738,445 | 9/1903 | Hoffmann | 403/371 X |
| 1,561,507 | 11/1925 | Clark | 403/371 |
| 1,687,777 | 10/1928 | McMutrie et al. | 403/370 X |
| 2,889,161 | 6/1959 | Powell et al. | 403/370 X |
| 4,202,644 | 5/1980 | Soussloff | 403/369 |
| 4,345,851 | 8/1982 | Soussloff | 403/369 |
| 4,367,053 | 1/1983 | Stratienko et al. | 403/371 |
| 4,543,704 | 10/1985 | Soussloff | 29/458 |
| 4,600,334 | 7/1986 | Soussloff | 403/369 |
| 4,615,640 | 10/1986 | Hosokawa | 403/369 |
| 4,824,281 | 4/1989 | Katsube | 403/369 |
| 5,009,539 | 4/1991 | Mullenberg | 403/370 |
| 5,374,135 | 12/1994 | Folsom et al. | 403/369 |
| 5,474,403 | 12/1995 | Hetrich | 403/369 |

FOREIGN PATENT DOCUMENTS

| | | | |
|---|---|---|---|
| 179220 | 9/1917 | Canada | 403/371 |
| 0318977 | 9/1993 | European Pat. Off. . | |
| 80524 | 7/1981 | Japan | 403/371 |

*Primary Examiner*—Anthony Knight
*Attorney, Agent, or Firm*—Dann, Dorfman, Herrell and Skillman; Henry H. Skillman

[57] ABSTRACT

A mounting device for coaxially anchoring a machine element upon a rotary shaft. The device fits between the interior bore of the machine element and the cylindrical surface of the shaft and is effective to position the element at any desired position longitudinally of the shaft and at any angular position circumferentially of the shaft. The device has inner and outer sleeves, the mating surfaces of which are similarly tapered so that relative axial displacement of the sleeves effects expansion and contraction of the interior bore and external surface of the combined elements. Rotation of a threaded nut at one end of the device effects the relative axial displacement of the inner and outer sleeves to afford expansion and contraction of the outer sleeve without straining the material of the sleeve or the nut.

58 Claims, 4 Drawing Sheets

MOUNTING DEVICE

FIELD OF THE INVENTION

The present invention relates to a mounting device for mounting a machine element upon a shaft in such a manner that the rotation of the shaft transmits its entire torque to the machine element without slippage due to the mounting. In particular, the device of the present invention provides an improved mounting device for mounting machine elements permitting infinitely-variable adjustment of the machine element on the shaft, both axially of the shaft and circumferentially thereof, and maintaining the machine element at a fixed, axial position after mounting on the shaft.

BACKGROUND OF THE INVENTION

The use of devices for mounting machine elements, such as pulleys and gears, upon a shaft is well-known. One difficulty is that the known devices for mounting a machine element upon a cylindrical shaft are cumbersome to use. For example, some devices require assembly of multiple pieces and adjustment of several screws, and other devices require modification of the shaft on which the machine element is mounted.

Another difficulty frequently encountered relates to the need for precise positioning of the machine elements at a fixed, axial position on the shaft when the machine element is mounted upon the shaft. This difficulty occurs when the mounting device is tightened and from a tendency of the machine element to slide axially along the mounting surface in response to the axial forces created by the confronting tapered surfaces of the elements in the mounting device.

SUMMARY OF THE INVENTION

In accordance with the present invention, a mounting device is provided that is easy to use. The device enables the mounting of a machine element by simply tightening a single nut to effect frictional engagement and also to ensure disengagement by loosening the same nut. The nut operates to positively release the frictional engagement produced by tightening the nut. Furthermore, the design of the present unit is of simple construction and is relatively inexpensive to manufacture.

The present invention also solves the difficulty of maintaining the machine element at a fixed position. Once mounted, the device retains the machine element at a fixed, axial position relative to the shaft.

A device for coaxially mounting a machine element having a bore upon a cylindrical shaft includes an outer sleeve for engaging the machine element. The outer sleeve has a tapered internal surface and a cylindrical external surface corresponding to the bore of the machine element. An axial slot extends longitudinally along the outer sleeve to permit expansion of the external surface of the outer sleeve. The outer sleeve also has internal threads at one end for threaded engagement with a nut having corresponding external threads. The nut includes a circumferential flange for engaging an inner sleeve.

The inner sleeve has a tapered external surface corresponding in angle of taper to the tapered internal surface of the outer sleeve and an interior bore corresponding in diameter to the cylindrical shaft. The inner sleeve includes a circumferential interlock for connecting the inner sleeve to the nut. The inner sleeve also includes a plurality of axial slots extending longitudinally along the inner sleeve to permit contraction of the interior bore of the inner sleeve. The slots are oriented and configured to provide the inner sleeve with sufficient flexibility to allow the circumferential interlock of the inner sleeve to flex to fit over the nut.

Rotating the nut axially displaces the outer sleeve in one direction relative to the nut, while the nut engages the inner sleeve thereby axially displacing the inner sleeve in an opposite direction. The relative displacement of the inner and outer sleeves causes the external surface of the outer sleeve to expand against the bore of the machine element and the interior bore of the inner sleeve to contract against the cylindrical shaft, which effects coaxial mounting of the machine element on the cylindrical shaft.

A second device for coaxially mounting a machine element having a bore upon a shaft includes a one-piece outer sleeve for engaging the machine element. The outer sleeve has a tapered internal surface and an external surface corresponding to the bore of the machine element. The outer sleeve has internal threads adjacent one end and a circumferential abutment extending radially inwardly at the distal end. The abutment confronts a cylindrical liner encircling the shaft. The liner has a cylindrical bore corresponding to the diameter of the shaft. A nut having external threads adjacent one end threadedly engages the outer sleeve. At the distal end, the nut has a first circumferential flange that engages an inner sleeve disposed between the outer sleeve and the liner. The inner sleeve has a tapered external surface having an angle of taper corresponding to the tapered internal surface of the outer sleeve. The inner sleeve also includes a second flange engaging the first flange of the nut. A biasing member is disposed within the bore of the nut, having one end abutting the liner, biasing the liner against the abutment of the outer sleeve.

Rotating the nut axially displaces the outer sleeve in one direction relative to the nut, while the nut engages the inner sleeve thereby axially displacing the inner sleeve in an opposite direction. The relative displacement of the inner and outer sleeves causes the external surface of the outer sleeve to expand against the bore of the machine element and the interior bore of the inner sleeve to contract against the liner thereby causing the liner to contract against the cylindrical shaft, which effects coaxial mounting of the machine element on the cylindrical shaft.

BRIEF DESCRIPTION OF THE DRAWINGS

The foregoing summary, as well as the following detailed description of the preferred embodiments of the present invention, will be better understood when read in conjunction with the appended drawings, in which.

DETAILED DESCRIPTION OF THE PREFERRED EMBODIMENTS

Figure 1:
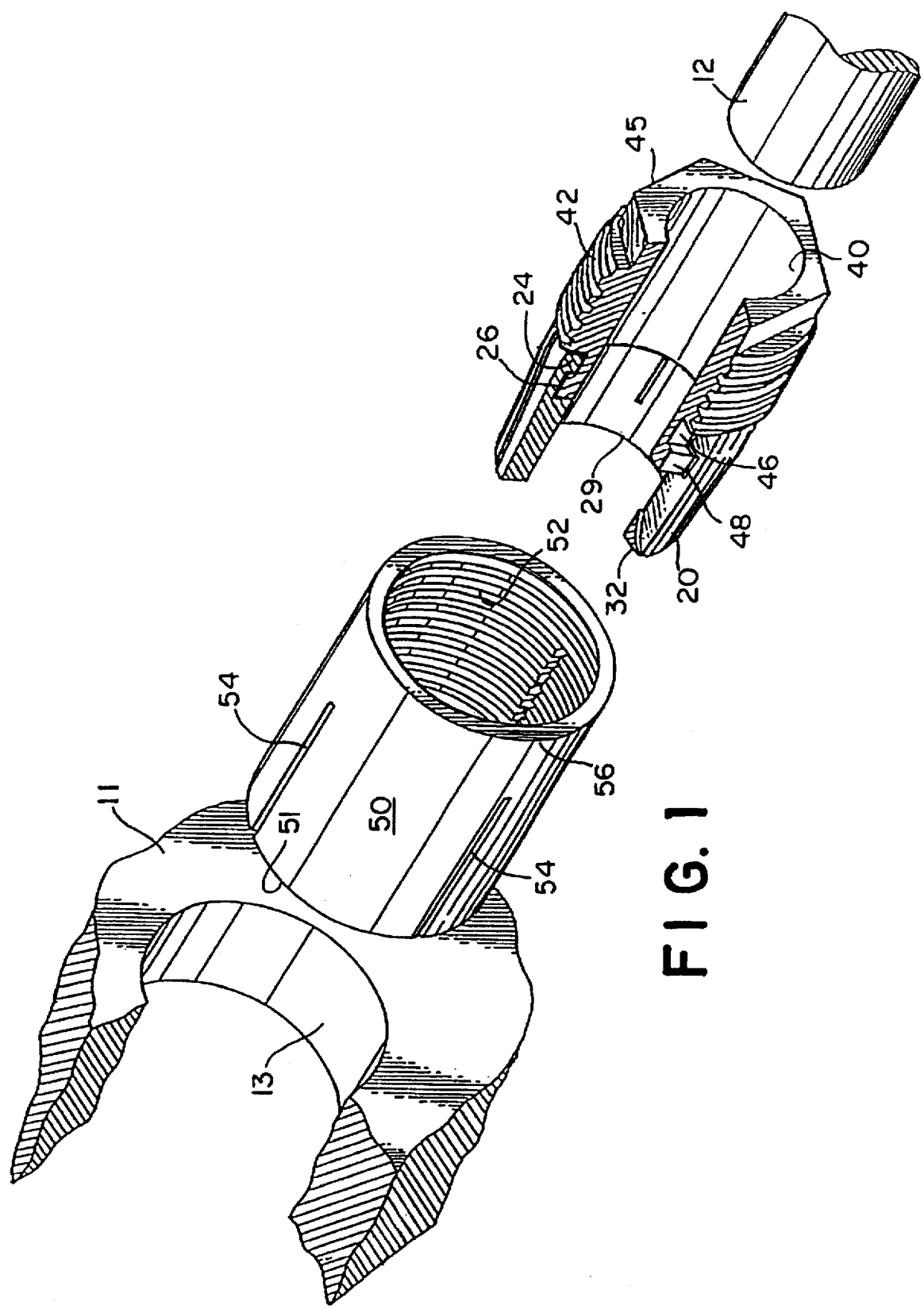
FIG. 1 is a fragmentary exploded perspective view of a mounting device, in accordance with the present invention, in position for coupling a machine element to a shaft.
Figure 2:
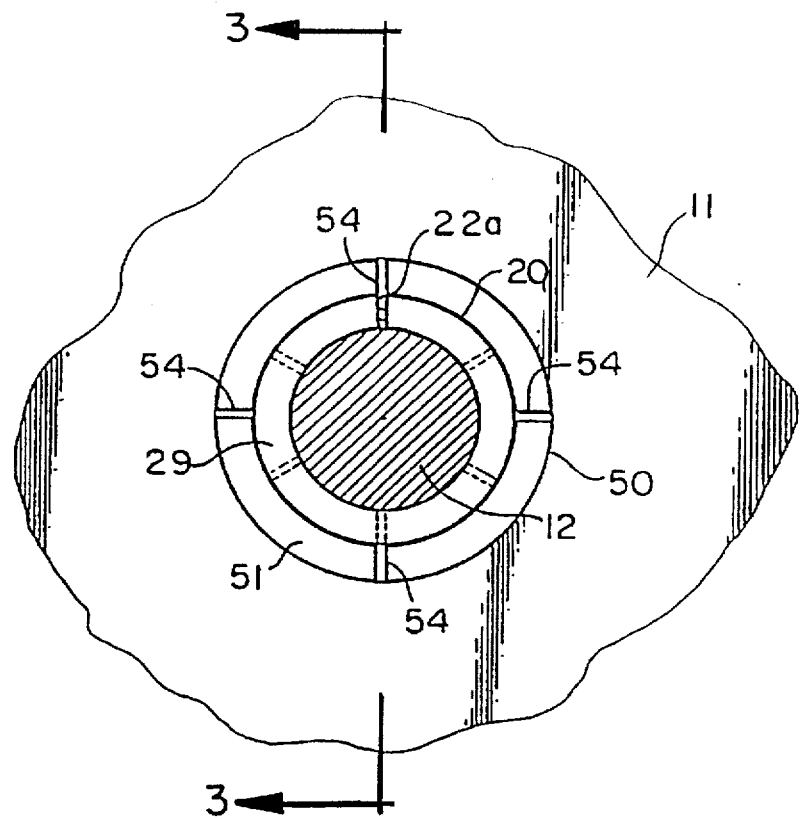
FIG. 2 is an end view of the assembled mounting device as seen from the right-hand end of FIG. 1.
Figure 3:
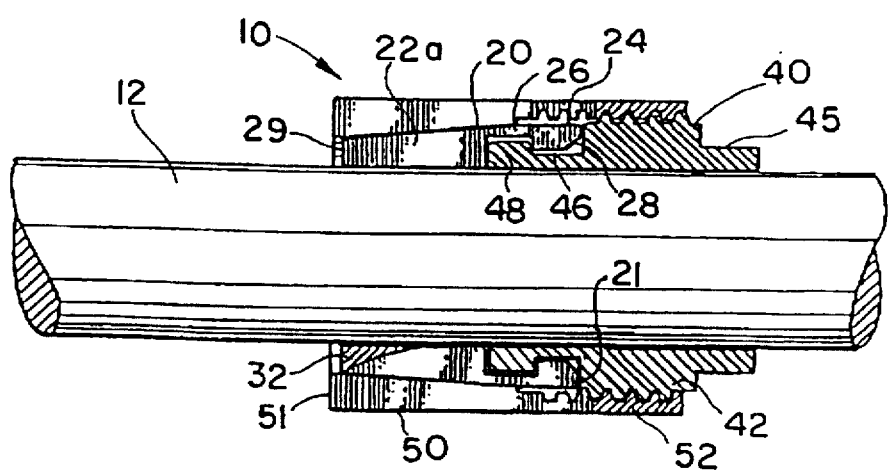
FIG. 3 is a transverse sectional view taken on the section line 3—3 of FIG. 2.

Referring now to the drawings and to FIGS. 1–3 specifically, a mounting device 10 designed to mount the hub of a machine element 11 upon a cylindrical shaft 12 is illustrated. In the present instance, the machine element 11 has a smooth cylindrical bore 13 whose axis coincides with the axis of the cylindrical surface of the shaft 12. The mounting device is designed to be positioned between the bore 13 and the shaft 12 and to be expanded therein to securely anchor the machine element 11 on the shaft at any desired position axially of the shaft and any angular position circumferentially of the shaft.

The mounting device incorporates an inner sleeve 20, an outer sleeve 50, and a locking nut 40. The inner sleeve 20 is tubular in form having an internal cylindrical bore whose diameter corresponds to the diameter of the shaft 12, the bore being of sufficiently greater diameter than the shaft 12 to permit free sliding movement of the inner sleeve 20 on the shaft 12 both axially and circumferentially. As shown, a circumferential flange 24 extends radially inward from the rearward or proximal end 21 of the inner sleeve 20. An annular groove 26 extends circumferentially about the inner surface of the inner sleeve 20 adjacent the flange. The forward or distal end of the inner sleeve 20 has a frusto-conical tapered external surface that cooperates with the outer sleeve as described below.

The inner sleeve 20 is adapted to fit within the outer sleeve 50, which is a unitary sleeve having four terminated axial slots 54 extending from the rearward end 51 of the outer sleeve. The axial slots 54 permit radial deflection of the outer sleeve 50 as the mounting device 10 is tightened and released. The outer surface of the outer sleeve 50 is cylindrical having a diameter that corresponds to the bore 13 of the machine element, the diameter of the outer sleeve being of sufficiently smaller diameter than the bore to permit free sliding movement between the machine element and the outer sleeve when the mounting device is not tightened. Alternatively, if the machine element has a tapered bore, the outer surface of the outer sleeve is tapered to correspond to the tapered machine element bore.

As shown in FIG. 3, the inner surface of the outer sleeve 50 tapers toward the forward or distal end 51 at the same angle of taper as the inner sleeve 20. In this way, when the outer sleeve 50 is rearwardly displaced relative to the inner sleeve 20 (i.e. from left to right in FIG. 3), the tapered surfaces of the inner and outer sleeves cooperate to expand the external tapered surface of the outer sleeve and contract the internal cylindrical surface of the inner sleeve 20, the contraction and expansion of the surfaces being substantially parallel to the common central axis of the assembly.

As shown, the rearward end of the outer sleeve 50 is internally threaded. The threaded portion 52 begins adjacent the rearward end of the outer sleeve and terminates prior to the tapered internal surface. As described above, the slots 54 in the outer sleeve 50 extend from the forward end 51, terminating prior to the rearward end. In this way, the free end portion of the threaded end of the outer sleeve is an unsplit solid continuous ring portion. This solid portion of the outer sleeve provides greater thread strength and improved threaded engagement with the nut 40, relative to a sleeve that is split along the entire axial length.

The outer sleeve 50 is displaced relative to the inner sleeve 20 by means of the nut 40. To this end, as illustrated in FIGS. 1 and 3, the nut 40 has external threads 42 which threadedly engage the threads 52 of the outer sleeve 50. Rotating the nut 40 axially displaces the nut relative to the outer sleeve. Because the inner sleeve 20 is connected to the nut, as discussed below, the inner sleeve is displaced relative to the outer sleeve as the nut is displaced.

The nut has an internal bore that is larger than the diameter of the shaft 12. In addition, the outer diameter of the nut is smaller than the outer diameter of the outer sleeve 350. In this way, when not tightened, the mounting device can pass through the bore 13 of the machine element 11, thereby allowing the mounting device to be mounted on the shaft from either direction.

In accordance with the invention, the nut 40 is interlocked with the inner sleeve 20 so as to permit the tapered external surface of the inner sleeve to slide up and down the inclined internal surface of the outer sleeve 50 when the nut is rotated. Sliding up toward the forward end 51, the tapered internal surface of the outer sleeve locks the inner sleeve 20 against the shaft 12 and the outer sleeve 50 against the bore 13 of the element 11. Sliding down the surface unlocks the mounting device 10. To provide a connection between the nut and the inner sleeve, the nut 40 is provided with a radially outwardly extending circumferential flange 48 and an external circumferential groove 46 adjacent the flange, the forward and rearward sidewalls of the groove being substantially perpendicular to the common axis of the assembly. The external nut flange 48 and circumferential groove 46 cooperate with the internal inner sleeve flange 24 and annular groove 26. Specifically, the external flange 48 of the nut engages the annular groove 26 of the inner sleeve, and the internal flange 24 of the inner sleeve engages the circumferential groove 46 of the nut. For this purpose, the external flange 48 of the nut has a width slightly less than the width of the annular groove 26 of the inner sleeve, and the internal flange 24 of the inner sleeve has a width slightly less than the width of the circumferential groove 46 of the nut. In this way, the rearward face of the external nut flange 48 confronts the rearward face of the annular groove 26 of the inner sleeve effecting forceful rearward axial movement of the inner sleeve 20 when the nut is threadedly displaced rearward relative to the outer sleeve 50. Similarly, the forward face of the external nut flange 48 confronts the forward face of the annular groove 26 of the inner sleeve, and the rearward face of the internal inner sleeve flange 24 confronts the rearward face of the circumferential groove around the nut 40 effecting forceful forward axial movement of the inner sleeve when the nut is threadedly displaced forward relative to the outer sleeve 50.

The inner diameter of the inner sleeve internal flange 24 is smaller than the outer diameter of the external nut flange 48, and the inner sleeve flange must pass over the nut flange to connect the inner sleeve to the nut. Therefore, to connect the one-piece inner sleeve to the nut, the inner sleeve must be sufficiently flexible to allow the inner sleeve to expand over the outwardly extending flange of the nut. For this purpose, the inner sleeve 20 is formed into a plurality of segments by means of slots 22 which extend axially longitudinally of the sleeve from the rearward end. All but the slot 22a, shown in FIG. 3, terminate along a line spaced inwardly from the forward end 29 of the inner sleeve 20. The termination of the slots 22, in conjunction with the through-slot 22a, provides a split web 32 joining the segments at the forward end 29. In the present instance, the inner sleeve is made from 1215 steel and provided with six equally spaced slots approximately 5/64" in width, five of which are terminated slots, and one of which is the through slot 22a. It will be recognized, however, that the number of slots, as well as the width, length and spacing of the slots can be varied to achieve the requisite flexibility. As seen most clearly in FIG. 3, the terminated slots 22 terminate just prior to forward end of the inner sleeve, so that the web 32 is thickest at the forward end 29 of the inner sleeve, tapering inwardly as the web extends toward the rearward end 21 of the inner sleeve. In this way, the axial length of the web 32 at the forward end 29 is sufficiently small to allow the inner sleeve to dinner sleeve to connect the inner sleeve to the nut.

The inner sleeve 20 is assembled to the nut 40 by driving the inner sleeve over the nut as follows. The inner sleeve is axially aligned behind the nut, and the rearward end 21 of the inner sleeve is axially displaced into engagement with the external nut flange 26. As the inner sleeve engages the nut, the inner sleeve flexes and expands radially outward over the nut flange. To facilitate the radial expansion, the rearward face of the internal flange 24 of the inner sleeve is chamfered at 28 as illustrated in FIG. 3. The inner sleeve is displaced rearwardly relative to the nut until the internal flange 24 of the inner sleeve is displaced past the external nut flange 48. The inner sleeve then resiliently contracts so that the internal flange 24 of the inner sleeve engages in the circumferential groove 46 around the nut, and the external nut flange 48 engages in the annular groove 26 in the inner sleeve. In this way, the inner sleeve 20 is captively entrained by the nut 40.

In operation, it should be noted that the mounting device is forcefully engaged between the bore 13 of the element 11 on one hand and the shaft 12 on the other hand by tightening the nut 40 to displace the inner and outer sleeves relative to one another upwardly against the confronting tapered surfaces. This displacement tends to contract the interior bore of the inner sleeve 20 and to expand the exterior surface of the outer sleeve 50. Likewise, the unit may be forcefully disengaged from between the element 11 and the shaft 12 by reverse rotation of the nut 40 so as to forcefully displace the outer sleeve 50 downwardly on the inner sleeve 20 in the direction of the taper of the confronting surfaces thereof (i.e. displacing the outer sleeve forward relative to the inner sleeve). This displacement permits contraction of the exterior surface of the outer sleeve 50 and also permits expansion of the interior bore of the inner sleeve 20.

The angle of taper of the external surface of the inner sleeve 20 and the internal surface of the outer sleeve 50 is selected relative to the length of the threaded portion 52 of the outer sleeve. A more shallow angle permits greater displacement of the outer sleeve 50 relative to the inner sleeve 20 without expansion of the mounting device 10. Alternatively, a sharper angle reduces the relative displacement of the sleeves before expansion of the device.

Figure 4:
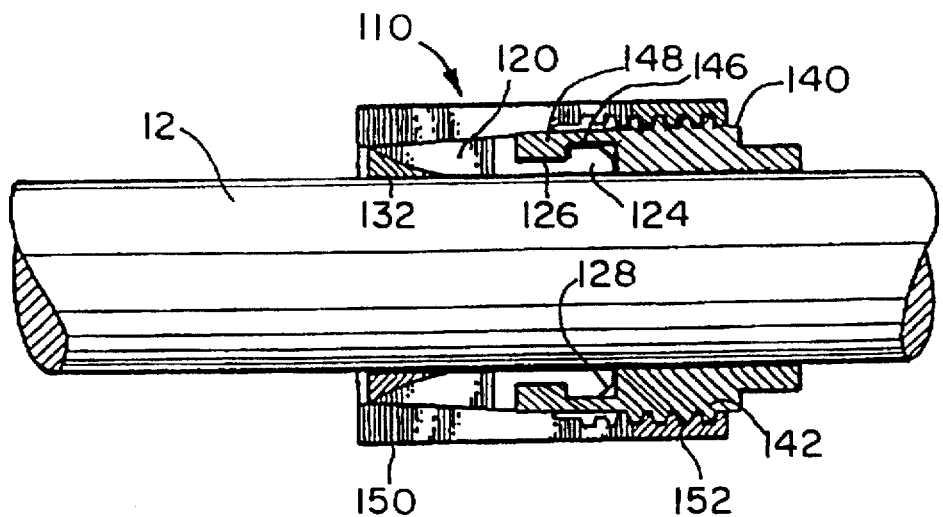
FIG. 4 is a transverse sectional view of a second embodiment of a mounting device in accordance with the present invention.

An alternative embodiment for a mounting device 110 is illustrated in FIG. 4. In this first alternative embodiment, the direction of the flanges and grooves for the inner sleeve and nut are reversed. More specifically, the inner sleeve incorporates an external flange 124 extending radially outwardly and an external circumferential groove 126 adjacent the flange. The nut incorporates an internal flange 148 extending radially inwardly and an internal annular groove 146. In this first alternative embodiment, the inner sleeve 120 is connected to the nut 140 by axially displacing the inner sleeve toward the nut so that the external flange 124 on the inner sleeve radially contracts, thereby allowing the external flange to displace axially past the internal nut flange. To facilitate this radial contraction, the rearward face of the external flange 124 of the inner sleeve 120 is chamfered. After the flange of the inner sleeve passes over the nut flange 18, the inner sleeve then resiliently expands so that the external flange on the inner sleeve engages in the annular groove 146 in the nut, and the internal nut flange engages the circumferential groove 126 around the outside of the inner sleeve. The remaining features of the inner sleeve 120 and the nut 140, as well as the outer sleeve, are similar to the corresponding features in the first embodiment illustrated in FIGS. 1–3. In addition, the operation of the embodiment of the mounting device illustrated in FIG. 4 is similar to the operation of the first embodiment of the mounting device.

Figure 5:
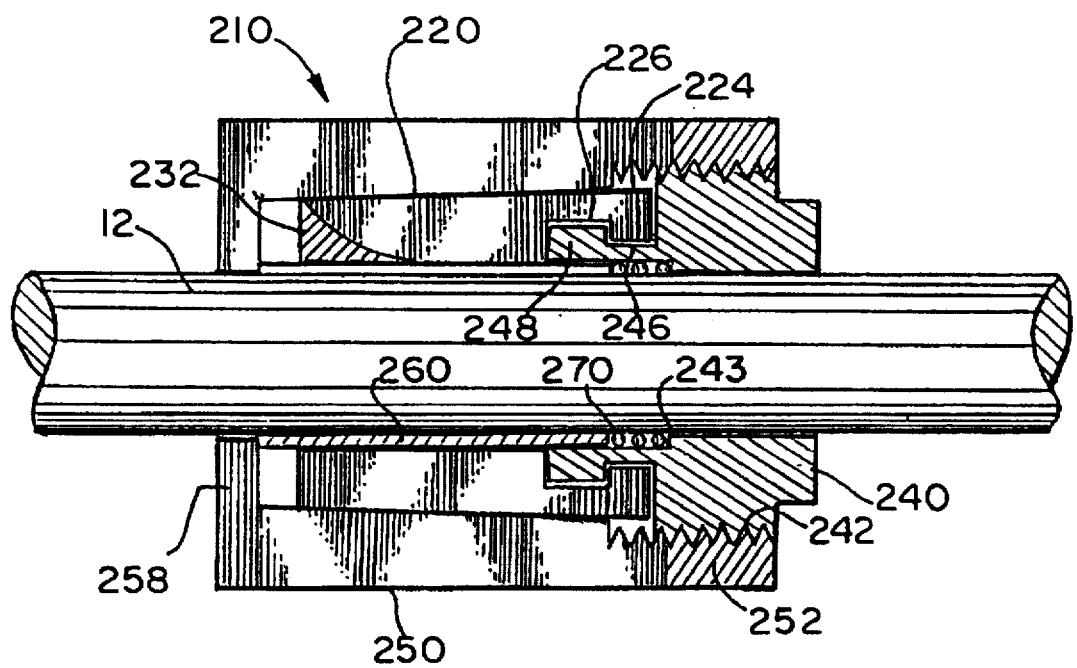
FIG. 5 is a transverse sectional view of a third embodiment of a mounting device in accordance with the present invention.

A third embodiment, referred to as a non-traversing mounting device 210 is illustrated in FIG. 5. The non-traversing mounting device operates to maintain the machine element at a fixed axial position while the mounting device is being tightened. The non-traversing embodiment includes an outer sleeve 250 having internal threads 252 at the rearward end and a tapered internal surface at the forward end similar to the first embodiment. A nut 240 is also provided, which includes external threads 242 cooperating with the outer sleeve 250, and an external circumferential flange 248 cooperating with an inner sleeve 220. The inner sleeve is similar to the inner sleeve in the first embodiment having an internal circumferential flange 224, an internal annular groove 226 and a split web 232. However, the inner sleeve in the non-traversing embodiment has a bore corresponding to the external surface of a split liner 260 that is disposed between the inner sleeve and the shaft 12 as shown in FIG. 5.

The liner 260 has a cylindrical external surface corresponding to the bore of the inner sleeve 220 and a cylindrical bore corresponding to the diameter of the shaft 12. The liner 260 also includes a plurality of terminated slots and a through slot to permit contraction and expansion of the inner sleeve as the mounting device is tightened and released from engagement with the shaft and machine element. The outer sleeve 250 in the non-traversing embodiment includes an abutment 258 that extends radially inward into contact with the forward end of the liner 260. In addition, the bore of the nut 240 has a recess 243 corresponding to the thickness of the liner 260, into which the liner extends. The recess 243 also provides an area between the nut 240 and the shaft 12 for receiving a spring 270. The spring 270 is disposed between the rearward end of the nut recess 243 and the rearward end of the liner 260, biasing the liner toward the abutment 258.

The inner sleeve 220 and the outer sleeve cooperate with one another and also with the nut 240 in a manner similar to the first embodiment. In operation, tightening the nut 240 draws the outer sleeve rearwardly so that the tapered internal surface of the outer sleeve 250 engages the tapered external surface of the inner sleeve 220. In response to the displacement of the outer sleeve relative to the nut, the abutment 258 operates against the liner 260 imparting a rearward axial force on the liner. The axial force imparted from the abutment is opposed by the elastic force of the spring 270 biased against the split sleeve. In this way, the mounting device is tightened without relative axial displacement between the liner 260, the outer sleeve 250 of the mounting device 10, and the shaft 12.

Figure 6:
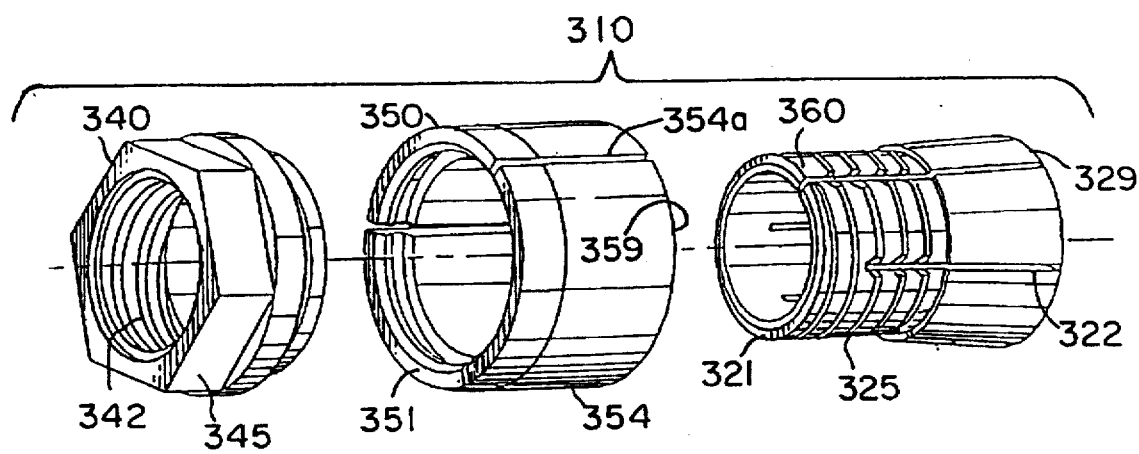
FIG. 6 is an exploded perspective view of a fourth embodiment of a mounting device in accordance with the present invention with the shaft removed.
Figure 7:
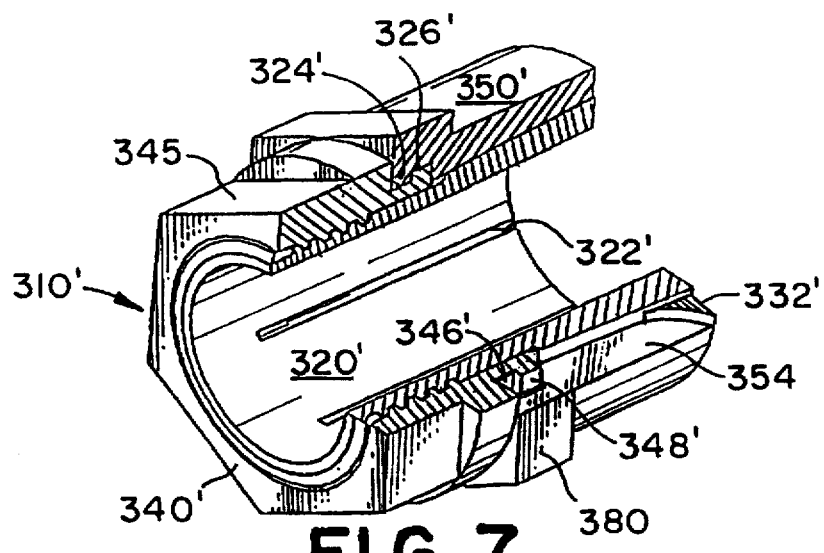
FIG. 7 is a perspective view of an assembled mounting device which is a modified version of the device illustrated in FIG. 6.

A fourth embodiment designated 310 is illustrated in FIGS. 6 and 7 in which the inner sleeve and outer sleeve are reversed relative to the first embodiment, so that the outer sleeve is captively entrained by the nut, and the inner sleeve threadedly engages the nut. In the embodiment illustrated in FIGS. 6 and 7, a one-piece outer sleeve 350 is provided, which has a cylindrical external surface corresponding to the bore of the machine element. The internal surface of the outer sleeve 350 is tapered adjacent the forward end. An internal flange 324 extending radially inwardly and an adjacent internal annular groove 326 are adjacent the rearward end of the outer sleeve. The internal flange 324 of the outer sleeve 350 engages the nut 340 in the same way that the internal flange 24 on the inner sleeve 20 in the first embodiment engages the nut. For this purpose, the nut 340 includes an external circumferential flange 348 extending radially outward and an adjacent external circumferential groove 346. The nut 340 also includes internal threads 342 for threadedly engaging the inner sleeve 320.

The inner sleeve is externally threaded 325 at the rearward end to cooperate with the nut 340. In addition, the inner sleeve has a tapered external surface forward of the threaded portion 325. The external surface of the inner sleeve 320 tapers at an angle corresponding to the taper of the internal surface of the outer sleeve 350 so that mating tapered surfaces slide up or down each other in response to relative displacement between the inner and outer sleeves.

The inner diameter of the internal flange 324 of the outer sleeve is smaller than the outer diameter of the external nut flange 348, and the outer sleeve flange must pass over the nut flange to connect the outer sleeve to the nut. Therefore, to connect the one-piece outer sleeve to the nut, the outer sleeve must be sufficiently flexible to allow the outer sleeve to radially expand over the outwardly extending external flange of the nut 340. For this purpose, the outer sleeve 350 is formed into a plurality of segments by means of slots 354 which extend axially longitudinally of the sleeve from the rearward end 351 as illustrated in FIGS. 6 and 7. All but one slot, terminate along a line spaced inwardly from the forward end 359 of the inner sleeve 350. The termination of the slots 352, in conjunction with the through-slot, provides a split web 332 joining the segments at the forward end 359. In the present instance, the outer sleeve is made from 1215 steel and is provided with equally spaced slots approximately 5/64" in width, two of which are terminated slots 354, and one of which is the through slot 354a. It will be recognized, however, that the number of slots, as well as the width, length and spacing of the slots can be varied to achieve the requisite flexibility. The terminated slots 322 terminate just prior to the forward end of the inner sleeve, so that the web 332 is thickest at the forward end of the outer sleeve, tapering inwardly as the web extends toward the rearward end 351 of the outer sleeve. In this way, the axial length of the web 332 at the forward end 359 is sufficient to allow the outer sleeve to deflect radially to connect the outer sleeve to the nut.

The outer sleeve 350 is connected to the nut 340 by driving the outer sleeve over the nut as follows. The rearward end 351 of the outer sleeve is axially displaced into engagement with the external nut flange 326. As the outer sleeve engages the nut, the outer sleeve flexes and expands radially outward over the external nut flange. To facilitate this expansion, the rearward face of the internal flange 324 of the outer sleeve may be chamfered. The outer sleeve is displaced rearwardly relative to the nut until the internal flange 324 of the outer sleeve is displaced past the external nut flange 348. The outer sleeve 350 then resiliently contracts so that the internal flange of the outer sleeve engages the circumferential groove 346 around the nut, and the external nut flange 348 engages the annular groove 326 in the outer sleeve. In this way, the outer sleeve is captively entrained by the nut.

Alternatively, the internal flange 324 of the outer sleeve and the external flange 348 of the nut may extend in the opposite direction, in a manner similar to the reversed flanges on the inner sleeve and nut illustrated in FIG. 4. In other words, the outer sleeve may have an external flange extending radially outwardly with an adjacent external circumferential groove. The cooperating nut has an internal flange extending radially inwardly with an adjacent internal annular flange. To connect the outer sleeve to the nut, the outer sleeve flexes inwardly to allow the external outer sleeve flange to displace axially past the internal nut flange. The external outer sleeve flange then resiliently expands to engage the annular groove in the nut and the nut flange engages the circumferential groove around the outer sleeve.

In the embodiment illustrated in FIG. 7, the outer sleeve 350' further includes a tool engaging surface. In the present, the tool engaging surface comprises a plurality of opposing planar gripping surfaces disposed about the periphery of the outer sleeve. In other respects, the sleeve 350' is identical to the sleeve 350, and the corresponding parts have been designated with primed reference numbers. In the present instance, the gripping surfaces are disposed in a hexagonal pattern similar to the hexagonal periphery of the nut 340 as illustrated in FIG. 7. The gripping surfaces 380 eliminate the need to grasp the shaft or the machine element to prevent the shaft from rotating during tightening or loosening of the mounting device by providing a means for transferring counter-torque to tighten or release the mounting device. Alternatively, the tool engaging surface can comprise one or more sockets for receiving a spanner wrench. In operation, a wrench or other tool engages the gripping surfaces 380 on the outer sleeve 350', and a second wrench engages the nut 340. Force is applied to the two wrenches to rotate the nut and the outer sleeve in opposite directions. For instance, to release the mounting device from a shaft and a machine element, the nut 340 is rotated counter-clockwise from the perspective of FIG. 7 and the outer sleeve 350' is rotated clockwise. Although the gripping surfaces are only illustrated in FIG. 7, such gripping surfaces 380 can similarly be provided on each of the embodiments illustrated in FIGS. 1-5.

The present invention is particularly effective to avoid damage to the shaft and the machine elements in case of catastrophic overload of the machine. A major advantage of the construction of the invention is that it slips and protects other elements of the machine without damage to the shaft or the machine element. In the event slippage due to excess loading, the unit itself is not damaged and may be used without replacement or readjustment. The construction also enables the units to be fabricated from materials other than metal where the operating conditions are such as to limit the selection of the material used in fabricating the parts.

The use of a single-piece inner sleeve in conjunction with a single piece outer sleeve is particularly suited for situation in which precise rotary balance is required. In known devices incorporating a multiple piece inner or outer sleeve, the pieces comprising the multiple piece sleeve can move relative to one another when the device is tightened or loosened, thereby altering the rotational balance of the device. By eliminating the multiple piece sleeve, the present invention provides a device having a substantially fixed rotary balance during operation of the device. In this way, the device can be circumferentially balanced during manufacture, and the device will retain the balance during normal operation.

It will be recognized by those skilled in the art that changes or modifications can be made to the above-described embodiments without department from the broad inventive concept of the invention. It should therefore be understood that this invention is not limited to the particular embodiments described herein but is intended to include all changes and modifications that are within the scope and spirit of the invention as set forth in the following claims.

I claim:

1. A device for coaxially mounting a machine element having a bore upon a shaft comprising:
   (a) a one-piece outer sleeve for engaging the machine element, said outer sleeve having a tapered internal surface and an external surface corresponding to the bore of the machine element, said outer sleeve having at least one axial slot extending longitudinally along said outer sleeve to permit expansion of the external surface of said outer sleeve, said outer sleeve also having internal threads adjacent one end;
   (b) a nut having external threads at one end and a circumferential flange at the distal end;
   (c) a one-piece inner sleeve for encircling the shaft, said inner sleeve having a tapered external surface corresponding in angle of taper to the tapered internal surface of said outer sleeve, an interior bore corresponding in diameter to the shaft, and a circumferential interlock engaging said nut, said inner sleeve having a plurality of axial slots extending longitudinally along said inner sleeve, wherein the configuration and orientation of said slots provide sufficient flexibility to allow said inner sleeve to flex to fit over said flange;
   wherein upon rotation of said nut, said external threads of said nut engage with said internal threads of said outer sleeve effecting axial displacement of said outer sleeve in one direction relative to said nut, and said nut engages said inner sleeve effecting axial displacement of said inner sleeve in an opposite direction, the displacements causing the internal bore of said inner sleeve to contract against the cylindrical shaft and the external surface of said outer sleeve to expand against the bore of the machine element.

2. The device according to claim 1 wherein said flange extends radially outwardly and said nut further comprises an annular groove adjacent said flange, wherein said inner sleeve is sufficiently resilient such that said inner sleeve contracts after flexing to fit over said flange thereby displacing said circumferential interlock into engagement with said circumferential groove.

3. The device according to claim 1 wherein said flange extends radially inwardly and said nut further comprises an annular groove adjacent said flange, wherein said inner sleeve is sufficiently resilient such that said inner sleeve expands after flexing to fit over said flange thereby displacing said circumferential interlock into engagement with said annular groove.

4. The device according to claim 1 wherein said nut further comprises a tool engaging surface and said outer sleeve further comprises a second tool engaging surface.

5. The device according to claim 4 wherein said second tool engaging surface is adjacent said one end of said outer sleeve.

6. The device according to claim 1 wherein the outer diameter of said outer sleeve is greater than the outer diameter of said nut.

7. The device according to claim 1 wherein said one end of said outer sleeve is continuous about the circumference.

8. The device according to claim 1 wherein said inner sleeve has an annular end wall and said end wall has a chamfered face.

9. A device for coaxially mounting a machine element having a bore upon a shaft comprising:
   (a) a one-piece inner sleeve for encircling the shaft, said inner sleeve having a tapered external surface and an interior bore corresponding to the diameter of the shaft, said inner sleeve having at least one axial slot extending longitudinally along said inner sleeve to permit contraction of the internal surface of said inner sleeve, said inner sleeve also having external threads adjacent one end;
   (b) a nut having internal threads at one end and a circumferential flange at the distal end;
   (c) a one-piece outer sleeve engaging the machine element, said outer sleeve having a tapered internal surface corresponding in angle of taper to the tapered external surface of said inner sleeve, an external surface corresponding to the bore of the machine element, and a circumferential interlock engaging said flange, said outer sleeve having a plurality of axial slots extending longitudinally along said outer sleeve, wherein the configuration and orientation said slots provides sufficient flexibility to allow said outer sleeve to flex to fit over said flange;
   wherein upon rotation of said nut, said internal threads of said nut engage with said external threads of said inner sleeve effecting axial displacement of said inner sleeve in one direction relative to said nut and said nut engages said outer sleeve effecting axial displacement of said outer sleeve in an opposite direction, the displacements causing the internal bore of said inner sleeve to contract against the cylindrical shaft and the external surface of said outer sleeve to expand against the bore of the machine element.

10. The device according to claim 9 wherein said flange extends radially outwardly and said nut further comprises an annular groove adjacent said flange, wherein said inner sleeve is sufficiently resilient such that said inner sleeve contracts after flexing to fit over said flange thereby displacing said circumferential interlock into engagement with said circumferential groove.

11. The device according to claim 9 wherein said flange extends radially inwardly and said nut further comprises an annular groove adjacent said flange, wherein said inner sleeve is sufficiently resilient such that said inner sleeve expands after flexing to fit over said flange thereby displacing said circumferential interlock into engagement with said annular groove.

12. The device according to claim 9 wherein said nut further comprises a tool engaging surface and said outer sleeve further comprises a second tool engaging surface.

13. The device according to claim 12 wherein said second tool engaging surface is adjacent said one end of said outer sleeve.

14. The device according to claim 9 wherein the outer diameter of said outer sleeve is greater than the outer diameter of said nut.

15. The device according to claim 9 wherein said one end of said outer sleeve is continuous about the circumference.

16. The device according to claim 9 wherein said inner sleeve has an annular end wall and said end wall has a chamfered face.

17. A device for mounting a machine element having a bore upon a shaft, comprising:
   (a) a one-piece outer sleeve for engaging the machine element, said outer sleeve having a tapered internal surface and an external surface corresponding to the bore of the machine element, said outer sleeve having at least one axial slot extending longitudinally along said outer sleeve to permit expansion of the external surface of said outer sleeve, said outer sleeve also having internal threads adjacent one end;
   (b) a nut having external threads at one end and a circumferential flange at the distal end;

(c) a one-piece inner sleeve for encircling the shaft, said inner sleeve having a tapered external surface and an interior bore corresponding in diameter to the shaft, said inner sleeve comprising a plurality of sections about the circumference of said inner sleeve, a web connecting said sections, and a circumferential interlock, said web being formed to allow said inner sleeve to flex over said flange so that said circumferential interlock engages said flange;

wherein upon rotation of said nut, said external threads of said nut engage with said internal threads of said outer sleeve effecting axial displacement of said outer sleeve in one direction relative to said nut, and said nut engages said inner sleeve effecting axial displacement of said inner sleeve in an opposite direction, the displacements causing the internal bore of said inner sleeve to contract against the cylindrical shaft and the external surface of said outer sleeve to expand against the bore of the machine element.

18. The device according to claim 17 wherein said flange extends radially outwardly and said nut further comprises an annular groove adjacent said flange, wherein said inner sleeve is sufficiently resilient such that said inner sleeve contracts after flexing to fit over said flange thereby displacing said circumferential interlock into engagement with said circumferential groove.

19. The device according to claim 17 wherein said flange extends radially inwardly and said nut further comprises an annular groove adjacent said flange, wherein said inner sleeve is sufficiently resilient such that said inner sleeve expands after flexing to fit over said flange thereby displacing said circumferential interlock into engagement with said annular groove.

20. The device according to claim 17 wherein said nut further comprises a tool engaging surface and said outer sleeve further comprises a second tool engaging surface.

21. The device according to claim 20 wherein said second tool engaging surface is adjacent said one end of said outer sleeve.

22. The device according to claim 17 wherein the outer diameter of said outer sleeve is greater than the outer diameter of said nut.

23. The device according to claim 17 wherein said one end of said outer sleeve is continuous about the circumference.

24. The device according to claim 17 wherein said inner sleeve has an annular end wall and said end wall has a chamfered face.

25. A device for mounting a machine element having a bore upon a shaft, comprising:
(a) an inner sleeve for encircling the shaft, said inner sleeve having a tapered external surface and an interior bore corresponding to the diameter of the shaft, said inner sleeve having at least one axial slot extending longitudinally along said inner sleeve to permit contraction of the internal surface of said inner sleeve, said inner sleeve also having external threads adjacent one end;
(b) a nut having internal threads at one end and a circumferential flange at the distal end;
(c) a one-piece outer sleeve engaging the machine element, said outer sleeve having a tapered internal surface and an external surface corresponding to the bore of the machine element, said outer sleeve comprising a plurality of circumferential sections spaced about the circumference of said outer sleeve, a web connecting said sections, and a circumferential interlock, said web being formed to allow said outer sleeve to flex over said flange of said nut so that said circumferential interlock engages said flange;

wherein upon rotation of said nut, said internal threads of said nut engage with said external threads of said inner sleeve effecting axial displacement of said inner sleeve in one direction relative to said nut, and said nut engages said outer sleeve effecting axial displacement of said outer sleeve in an opposite direction, the displacements causing the internal bore of said inner sleeve to contract against the cylindrical shaft and the external surface of said outer sleeve to expand against the bore of the machine element.

26. The device according to claim 25 wherein said flange extends radially outwardly and said nut further comprises an annular groove adjacent said flange, wherein said outer sleeve is sufficiently resilient such that said outer sleeve contracts after flexing to fit over said flange thereby displacing said circumferential interlock into engagement with said circumferential groove.

27. The device according to claim 25 wherein said flange extends radially inwardly and said nut further comprises an annular groove adjacent said flange, wherein said outer sleeve is sufficiently resilient such that said outer sleeve expands after flexing to fit over said flange thereby displacing said circumferential interlock into engagement with said annular groove.

28. The device according to claim 25 wherein said nut further comprises a tool engaging surface and said outer sleeve further comprises a second tool engaging surface.

29. The device according to claim 28 wherein said second tool engaging surface is adjacent said one end of said outer sleeve.

30. The device according to claim 25 wherein the outer diameter of said outer sleeve is greater than the outer diameter of said nut.

31. The device according to claim 25 wherein said one end of said outer sleeve is continuous about the circumference.

32. The device according to claim 25 wherein said inner sleeve has an annular end wall and said end wall has a chamfered face.

33. A device for mounting a machine element having a bore upon a shaft, comprising:
(a) a one-piece outer sleeve for engaging the machine element, said outer sleeve having a tapered internal surface and an external surface corresponding to the bore of the machine element, said outer sleeve having at least one axial slot extending longitudinally along said outer sleeve to permit expansion of the external surface of said outer sleeve, said outer sleeve also having internal threads adjacent one end;
(b) a nut having external threads at one end and a first circumferential flange at the distal end;
(c) a one-piece inner sleeve for encircling the shaft, said inner sleeve being connected to said nut and having a tapered external surface corresponding in angle of taper to the tapered internal surface of said outer sleeve, and an interior bore corresponding in diameter to the shaft, said inner sleeve comprising a second circumferential flange engaging said first flange to prevent separation of said inner sleeve from said nut, wherein relative axial displacement of said inner sleeve toward said nut causes said sleeve to flexibly displace radially allowing said second flange to axially displace past said first flange;

wherein upon rotation of said nut, said external threads of said nut engage with said internal threads of said outer sleeve effecting axial displacement of said outer sleeve in one direction relative to said nut and said nut engages said inner sleeve effecting axial displacement of said inner sleeve in an opposite direction, the displacements causing the internal bore of said inner sleeve to contract against the cylindrical shaft and the external surface of said outer sleeve to expand against the bore of the machine element.

34. The device according to claim 33 wherein said first flange extends radially outwardly and said nut further comprises an annular groove adjacent said flange, wherein said inner sleeve is sufficiently resilient such that said inner sleeve contracts after flexing to fit over said first flange thereby displacing said second flange into engagement with said circumferential groove.

35. The device according to claim 33 wherein said first flange extends radially inwardly and said nut further comprises an annular groove adjacent said first flange, wherein said inner sleeve is sufficiently resilient such that said inner sleeve expands after flexing to fit over said first flange thereby displacing said second flange into engagement with said annular groove.

36. The device according to claim 33 wherein said nut further comprises a tool engaging surface and said outer sleeve further comprises a second tool engaging surface.

37. The device according to claim 36 wherein said second tool engaging surface is adjacent said one end of said outer sleeve.

38. The device according to claim 33 wherein the outer diameter of said outer sleeve is greater than the outer diameter of said nut.

39. The device according to claim 33 wherein said one end of said outer sleeve is continuous about the circumference.

40. The device according to claim 33 wherein said inner sleeve has an annular end wall and said end wall has a chamfered face.

41. A device for mounting a machine element having a bore upon a shaft, comprising:

(a) an inner sleeve for encircling the shaft, said inner sleeve having a tapered external surface and an interior bore corresponding to the diameter of the shaft, said inner sleeve having at least one axial slot extending longitudinally along said inner sleeve to permit contraction of the internal surface of said inner sleeve, said inner sleeve also having external threads at one end;

(b) a nut having internal threads at one end and a first circumferential flange at the distal end;

(c) a one-piece outer sleeve engaging the machine element, said outer sleeve having a tapered internal surface corresponding in angle of taper to the tapered external surface of said inner sleeve and an external surface corresponding to the bore of the machine element, said outer sleeve comprising a second circumferential flange engaging said first flange to prevent separation of said outer sleeve from said nut, wherein relative axial displacement of said outer sleeve toward said nut causes said outer sleeve to flexibly displace radially allowing said second flange to axially displace past said first flange;

wherein upon rotation of said nut, said internal threads of said nut engage with said external threads of said inner sleeve effecting axial displacement of said inner sleeve in one direction relative to said nut and said nut engages with said inner sleeve effecting axial displacement of said inner sleeve in an opposite direction, the displacements causing the internal bore of said inner sleeve to contract against the cylindrical shaft and the external surface of said outer sleeve to expand against the bore of the machine element.

42. The device according to claim 41 wherein said flange extends radially outwardly and said nut further comprises an annular groove adjacent said first flange, wherein said outer sleeve is sufficiently resilient such that said outer sleeve contracts after flexing to fit over said first flange thereby displacing said circumferential interlock into engagement with said annular groove.

43. The device according to claim 41 wherein said first flange extends radially inwardly and said nut further comprises an annular groove adjacent said first flange, wherein said outer sleeve is sufficiently resilient such that said outer sleeve expands after flexing to fit over said flange thereby displacing said circumferential interlock into engagement with said annular groove.

44. The device according to claim 41 wherein said nut further comprises a tool engaging surface and said outer sleeve further comprises a second tool engaging surface.

45. The device according to claim 44 wherein said second tool engaging surface is adjacent said one end of said outer sleeve.

46. The device according to claim 41 wherein the outer diameter of said outer sleeve is greater than the outer diameter of said nut.

47. The device according to claim 41 wherein said one end of said outer sleeve is continuous about the circumference.

48. The device according to claim 41 wherein said inner sleeve has an annular end wall and said end wall has a chamfered face.

49. A device for coaxially mounting a machine element having a bore upon a shaft comprising:

(a) a one-piece outer sleeve for engaging the machine element, said outer sleeve having a tapered internal surface and an external surface corresponding to the bore of the machine element, said outer sleeve having internal threads adjacent one end and a circumferential abutment extending inwardly radially;

(b) a cylindrical liner encircling the shaft, said liner having a cylindrical bore corresponding to the diameter of the shaft, wherein said liner confronts said abutment;

(c) a nut having external threads adjacent one end and a first circumferential flange at the distal end, said nut having an internal bore that is greater in diameter than the diameter of the shaft;

(d) an inner sleeve disposed between said outer sleeve and said liner, said inner sleeve having a tapered external surface corresponding in taper to the tapered internal surface of said outer sleeve, and a second flange engaging said first flange;

(e) a biasing member disposed within the bore of said nut, said biasing member abutting an end of said liner, biasing said liner against said abutment;

wherein upon rotation of said nut, said external threads of said nut engage with said internal threads of said outer sleeve effecting axial displacement of said outer sleeve in one direction relative to said nut and said nut engages said inner sleeve effecting axial displacement of said inner sleeve in an opposite direction, the displacements causing the external surface of said outer sleeve to expand against the bore of the machine element and the internal bore of said inner sleeve to contract against said liner thereby causing the liner to contract against the cylindrical shaft.

50. The device according to claim 49 wherein said inner sleeve is one piece, and said second flange engages said first flange to prevent separation of said inner sleeve from said nut.

51. The device according to claim 50 wherein relative axial displacement of said inner sleeve toward said nut causes said inner sleeve to flexibly displace radially allowing said second flange to axially displace past said first flange.

52. The device according to claim 51 wherein said first flange extends radially outward and said nut further comprises an annular groove adjacent said first flange, wherein said inner sleeve is sufficiently resilient such that said inner sleeve contracts after flexing to fit over said first flange thereby displacing said second flange into engagement with said annular groove.

53. The device according to claim 51 wherein said first flange extends radially inward and said nut further comprises an annular groove adjacent said first flange, wherein said inner sleeve is sufficiently resilient such that said inner sleeve expands after flexing to fit over said first flange thereby displacing said second flange into engagement with said annular groove.

54. The device according to claim 49 wherein said nut further comprises a tool engaging surface and said outer sleeve further comprises a second tool engaging surface.

55. The device according to claim 49 wherein said second tool engaging surface is adjacent said one end of said outer sleeve.

56. The device according to claim 49 wherein the outer diameter of said outer sleeve is greater than the outer diameter of said nut.

57. The device according to claim 49 wherein said one end of said outer sleeve is continuous about the circumference.

58. The device according to claim 49 wherein said inner sleeve has an annular end wall and said end wall has a chamfered face.

* * * * *

UNITED STATES PATENT AND TRADEMARK OFFICE
CERTIFICATE OF CORRECTION

PATENT NO. : 5,695,297

DATED : December 9, 1997

INVENTOR : Randall R. Geib

It is certified that errors appear in the above-identified patent and that said Letters Patent is hereby corrected as shown below:

Column 5, lines 7-8, delete "dinner sleeve" and insert --deflect radially--;

line 15, change "the radial" to --this radial--;

line 66, change "18" to --148--.

Signed and Sealed this

Tenth Day of March, 1998

Attest:

BRUCE LEHMAN

Attesting Officer

Commissioner of Patents and Trademarks